US011805202B2

(12) United States Patent
Lindenau et al.

(10) Patent No.: US 11,805,202 B2
(45) Date of Patent: *Oct. 31, 2023

(54) REAL-TIME CRIME CENTER SOLUTION WITH DISPATCH DIRECTED DIGITAL MEDIA PAYLOADS

(71) Applicant: Fusus, Inc., Peachtree Corners, GA (US)

(72) Inventors: Christopher R. Lindenau, Peachtree Corners, GA (US); Anthony C. Baldoni, Roswell, GA (US); David A. Robinson, Atlanta, GA (US); Sahil N. Merchant, Minneapolis, MN (US)

(73) Assignee: FUSUS, INC., Peachtree Corners, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/752,626

(22) Filed: May 24, 2022

(65) Prior Publication Data
US 2022/0286555 A1   Sep. 8, 2022

Related U.S. Application Data

(63) Continuation of application No. 17/013,008, filed on Sep. 4, 2020, now Pat. No. 11,368,586.

(51) Int. Cl.
*H04M 3/51* (2006.01)
*G06N 20/00* (2019.01)
(Continued)

(52) U.S. Cl.
CPC .......... *H04M 3/5116* (2013.01); *G06F 40/40* (2020.01); *G06N 5/01* (2023.01); *G06N 20/00* (2019.01);
(Continued)

(58) Field of Classification Search
CPC .... G08B 25/007; G08B 25/009; H04N 7/181; H04M 11/04
(Continued)

(56) References Cited

U.S. PATENT DOCUMENTS 8,576,066 B2   11/2013   Bivens
10,149,110 B2  12/2018   Cao et al.
(Continued)

FOREIGN PATENT DOCUMENTS

EP   3965085       3/2022
JP   20020298261   10/2002
WO   2020009591    1/2020

OTHER PUBLICATIONS

Euroepan Patent Office, European Search Report dated Jan. 21, 2022 in Application 21194779.1.
(Continued)

*Primary Examiner* — Maria El-Zoobi
(74) *Attorney, Agent, or Firm* — NK Patent Law

(57) ABSTRACT

A cloud-based real-time crime center with dispatch directed digital media payloads configured to support both emergency dispatchers and emergency responders responding to an incident requiring assistance. The new dispatch system is "cloud-based" in that it provides a central hub or repository for gathering live video streams and data streams that are processed to fuse them together to provide a map-based interface for the dispatcher to access via a desktop or other computing station at a central agency location and for the responders in the field to access via vehicle-mounted or portable client devices. The dispatch system processes the video and data streams to generate a dispatch directed payload that includes data and video relevant to the identified incident and that can be readily communicated (due to its reduced or controlled size) to field responders to make
(Continued)

their response more effective and to increase both the safety of the responders and those involved in the incident.

18 Claims, 4 Drawing Sheets

(51) Int. Cl.
| | |
|---|---|
| G16Y 40/50 | (2020.01) |
| G06F 40/40 | (2020.01) |
| H04N 7/18 | (2006.01) |
| H04N 21/2187 | (2011.01) |
| G16Y 10/75 | (2020.01) |
| G06Q 10/105 | (2023.01) |
| G06Q 50/26 | (2012.01) |
| G06T 11/00 | (2006.01) |
| G06N 5/01 | (2023.01) |

(52) U.S. Cl.
CPC ......... *G06Q 10/105* (2013.01); *G06Q 50/265* (2013.01); *G06T 11/00* (2013.01); *G16Y 10/75* (2020.01); *G16Y 40/50* (2020.01); *H04M 3/5183* (2013.01); *H04N 7/181* (2013.01); *H04N 21/2187* (2013.01); *H04M 2242/04* (2013.01); *H04M 2242/14* (2013.01); *H04M 2242/30* (2013.01)

(58) Field of Classification Search
USPC ...................................................... 455/404.1
See application file for complete search history.

(56) References Cited

U.S. PATENT DOCUMENTS

| | | | |
|---|---|---|---|
| 10,650,247 B2 | 5/2020 | Lemberger et al. | |
| 11,089,268 B2 | 8/2021 | Golan et al. | |
| 11,095,858 B2 | 8/2021 | Golan et al. | |
| 11,197,145 B2 | 12/2021 | Martin | |
| 2003/0012344 A1 | 1/2003 | Agarwal et al. | |
| 2008/0084473 A1* | 4/2008 | Romanowich | G08B 13/19671 348/E7.086 |
| 2010/0238286 A1* | 9/2010 | Boghossian | G08B 13/19697 348/143 |
| 2011/0111728 A1* | 5/2011 | Ferguson | H04W 4/90 455/404.1 |
| 2011/0151825 A1* | 6/2011 | Mathis | G08B 27/001 455/404.1 |
| 2013/0072145 A1 | 3/2013 | Dantu | |
| 2014/0368601 A1 | 12/2014 | DeCharms | |
| 2015/0312527 A1 | 10/2015 | Ansiaux et al. | |
| 2016/0381537 A1* | 12/2016 | R | H04W 4/021 455/404.1 |
| 2018/0192292 A1* | 7/2018 | Coney | H04W 12/065 |
| 2020/0346751 A1* | 11/2020 | Horelik | B64U 10/13 |
| 2022/0007828 A1 | 3/2022 | Lindenau et al. | |

OTHER PUBLICATIONS

USPTO, Non-Final Office Action dated May 4, 2022 in U.S. Appl. No. 17/214,542.
USPTO, Non-Final Office Action dated Feb. 14, 2022 in U.S. Appl. No. 17/013,008.
USPTO, Notice of Allowance dated May 5, 2022 in U.S. Appl. No. 17/013,008.
USPTO, Notice of Allowance dated Jul. 28, 2022 in U.S. Appl. No. 17/214,542.
USPTO, Corrected Notice of Allowance dated Aug. 9, 2022 in U.S. Appl. No. 17/214,542.
CIPO, Combined Canadian Office Action and Examination Search Report dated Mar. 29, 2022 in Application No. 3,105,738.
USPTO, Corrected Notice of Allowance dated May 17, 2022 in U.S. Appl. No. 17/013,008.
EPO; Office Action from Corresponding European Patent Application No. 21194779.1, dated Jun. 6, 2023, 7 pages.

* cited by examiner

REAL-TIME CRIME CENTER SOLUTION WITH DISPATCH DIRECTED DIGITAL MEDIA PAYLOADS

CROSS-REFERENCE TO RELATED APPLICATION

This application is a continuation of U.S. Non-Provisional application Ser. No. 17/013,008, entitled, "REAL-TIME CRIME CENTER SOLUTION WITH DISPATCH DIRECTED DIGITAL MEDIA PAYLOADS," filed on Sep. 4, 2020, which is incorporated by reference herein as if set forth in full, and priority to this application is claimed to the full extent allowable under U.S. laws and regulations.

BACKGROUND

1. Field of the Description

The present description relates, in general, to emergency dispatch systems and processes, and, more particularly, to a real-time crime center system that is cloud-based and configured to provide unique payloads of data and video to emergency dispatch centers and to emergency responders including police department personnel, firefighters, and the like.

2. Relevant Background

A dispatcher is a communications worker who receives and transmits information to coordinate operations of other personnel and vehicles carrying out a service. A number of organizations, including police and fire departments and emergency medical services use dispatchers to relay information, direct personnel, and coordinate their operations. An emergency dispatcher, also known as a public safety dispatcher or 9-1-1 dispatcher, receives calls from individuals who require emergency services including police services, firefighting, and emergency medical services.

Once information is obtained from the caller, the dispatcher activates the appropriate services necessary to respond to the nature of the call for help. The dispatcher also obtains and relays pertinent information to the field units to help ensure the adequacy and safety of the response, and, in the process, the dispatcher is generating a dispatcher incident narrative that may later be reviewed. Emergency dispatchers may also use preapproved protocols to talk a caller or bystander through lifesaving medical procedures such as cardiopulmonary resuscitation, childbirth, and first aid.

Presently, law enforcement and other agencies rely heavily upon the skill and experience of the human dispatcher to quickly analyze each call for assistance and to respond correctly and quickly to dispatch proper personnel and equipment for each incident. The responding personnel (i.e., "responders" or "dispatched personnel") may, in some cases, be provided or call up a map of the location of the incident, but, otherwise, they often are only provided information obtained by the dispatcher who took the call. As a result, most responders have to approach the incident scene with an often-inadequate amount of information about the incident, which can result in unsafe situations for the responders and for the people involved in the incident.

SUMMARY

The present description provides a cloud-based digital media payload dispatch system that is configured to support both emergency dispatchers and emergency responders responding to an incident requiring assistance. The new dispatch system is "cloud-based" in that it provides a central hub or repository for gathering live video streams and data streams that are processed to fuse them together to provide a map-based interface for the dispatcher to access via a desktop or other computing station at a central agency location and for the responders in the field to access via vehicle-mounted or portable client devices. The dispatch system processes the video and data streams to generate a dispatch directed payload that includes data and video relevant to the identified incident and that can be readily communicated (due to its reduced or controlled size) to and utilized by field responders to make their response more effective and to increase both the safety of the responders and those involved in the incident.

The cloud-based dispatch system is designed to address problems with prior dispatching systems including fragmentation, lack of access, inefficiency, and affordability. With regard to fragmentation, the dispatch directed payload is configured to pull together previously disparate and fragmented data streams and to fuse or combine them into a coherent picture that can be used by real-time emergency centers (e.g., by center personnel such as dispatchers) and responders in the field (e.g., by police officers) to respond more efficiently. The dispatch system addresses lack of access by unlocking previously inaccessible resources such as private camera streams and non-edge devices (with "edge devices" being those providing an entry point into enterprise or service provider core networks such as those of a metropolitan city or agency network) and integrates their outputs into the dispatch directed payload provided in the map-based interface. With regard to inefficiency, the dispatch directed payload is enhanced with richer data, with improves response times and enables the user (e.g., a first responder) to gain a degree of situational awareness that was not possible with prior solutions. As to affordability, the dispatch system has developed and deployed technology in a new way so as to radically reduce costs of implementation, and it represents a significant step forward for cloud-based public safety technology.

Unlike traditionally federated or fused video and Internet of Things (IoT) systems, the new dispatch system does not require an expensive hardware overhaul in order to function. This means that a law enforcement or other emergency response agency can deploy more functionality in less time and at a much lower cost. The interface and data delivery provided by the new dispatch system represent a redesign of law enforcement (or other incident response) information delivery systems as the system effectively combines multiple streams of video and data into a cohesive whole, thereby creating greater efficiencies at scale. Artificial intelligence (AI) algorithms can be implemented within the dispatch system to enable video and data to be analyzed faster and/or to create automation that was not previously available.

More particularly, an emergency dispatch system is provided for creating a map-based interface for delivering a dispatch or incident specific digital media payload to client devices (such as a dispatcher's client device or responders' client devices). The system includes a dispatch processing hub communicatively linked via a communications network with a plurality of client devices. The system includes memory or data storage (e.g., cloud-based servers or the like) storing data from data sources and video from video sources. On the dispatch processing hub (which may be provided on one-to-many cloud-based computing devices), a map interface generator operates to generate a map-based interface for display upon a display device of each of the plurality of client devices, and the map-based interface provides access to a subset of the video from the video sources and to a subset of the data from the data sources. Further, on the dispatch processing hub, a dispatch payload generator functions to create a digital payload accessible by, or for delivery to (such as in response to a user clicking an icon or link in the map-based interface) the plurality of the client devices including the subset of the video and the subset of the data both being determined by the dispatch payload generator as being related to an incident call received by an emergency agency system.

In some implementations of the system, the data storage stores a registry map defining cameras available in the video sources to provide the video and further stores associated locations within a geographic region of each of the cameras. The dispatch payload generator may then determine a set of the cameras being within image-capture range of a location of an incident associated with the incident call, and video streams from each of the set of cameras are provided in the subset of the video in the payload. In such implementations, the dispatch payload generator identifies an orientation of the set of the cameras within image-capture range and creates a subset of the cameras in the set of the cameras being focused on or toward the location of the incident. Further, video streams from each of the subset of the cameras can be provided in the subset of the video in the payload.

In some embodiments, the dispatch payload generator processes the subset of the video to detect objects and, in response, generates a set of searchable object detection data. In these and other cases, the subset of the data includes geolocations of responders in a geographic region including a location of the incident, and the map-based interface includes indicators of one or more of the geolocations. The subset of the data may include at least one building floor plan for a building at or proximate to a location of an incident associated with the incident call, and the map-based interface includes a link to the at least one building floor plan. In some implementations of the system, the dispatch payload generator processes a dispatcher narrative of the incident call using natural language processing (NLP) to determine a location and other specific details of an incident associated with the incident call.

The hub may be configured so that the payload is stored in the data storage in an evidence vault to be accessible by an identifier for an incident associated with the incident call. Also, a plurality of the video sources may include cameras or networks of cameras, and the system further may include a dispatch platform appliance coupled with the cameras or networks of cameras to communicatively link the cameras or networks of cameras with the dispatch processing hub, whereby video streams from the cameras or networks of cameras are automatically fed over the communications network to the data processing hub.

The dispatch payload generator may employ a rules-based engine to generate the payload. Then, the subset of the data and the subset of the video can be selected based on at least one of a responder assigned to the incident call, a mode of data receipt associated with the responder assigned to the incident call, and a role within an emergency agency of the responder assigned to the incident call. In some cases, the dispatch payload generator can perform at least one of: (a) analysis of the video with artificial intelligence to identify the subset of the video as being related to the incident call; and (b) analysis of Internet-of-Things (IoT) information gathered by the dispatch processing hub to identify a set of IoT information related to the incident call.

DETAILED DESCRIPTION

In brief, embodiments described herein are directed toward a new cloud-based real-time crime center solution with a digital media enriched dispatch system. The dispatch system was developed by the inventors to enable law enforcement and public safety agencies to operate more efficiently with improved operational intelligence and with a proactive emphasis on officer (or "responder"), citizen, and community safety. The dispatch system, when used by law enforcement agencies, may be considered a real-time crime center in the cloud platform.

The dispatch system operates to extract and unify live video and data feeds from virtually any source. In this manner, the dispatch system creates or includes a central hub that enhances the situational awareness and investigative capabilities of law enforcement and public safety agencies. The dispatch system is adapted to bring all personnel and emergency operations centers under a unified umbrella that aggregates video and data, such as with computer-aided dispatch (CAD) or other mapping systems and software, to facilitate easier tracking of personnel and incidents in a map-based interface. Digital evidence, relating to an incident to which response was provided, may be stored in a secure digital vault (which may be configured to be Criminal Justice Information Services (CJIS) compliant) that can then be made accessible to investigators.

The video sources of the dispatch system may include feeds from a camera on a drone, a traffic camera, a private cellphone or smartphone (or other similar computing and/or communication device), a building security camera, a camera on a bomb disposal or response robot, and the like. The dispatch system can extract the live video feed and send it to an emergency operations center and to responders in the field. The dispatch system combines video with other utilities like real-time officer/responder geolocator feeds, a registry map of public and private cameras in a region associated with an incident, a multi-media tips line for the public, and a digital evidence vault for investigators.

Figure 1:
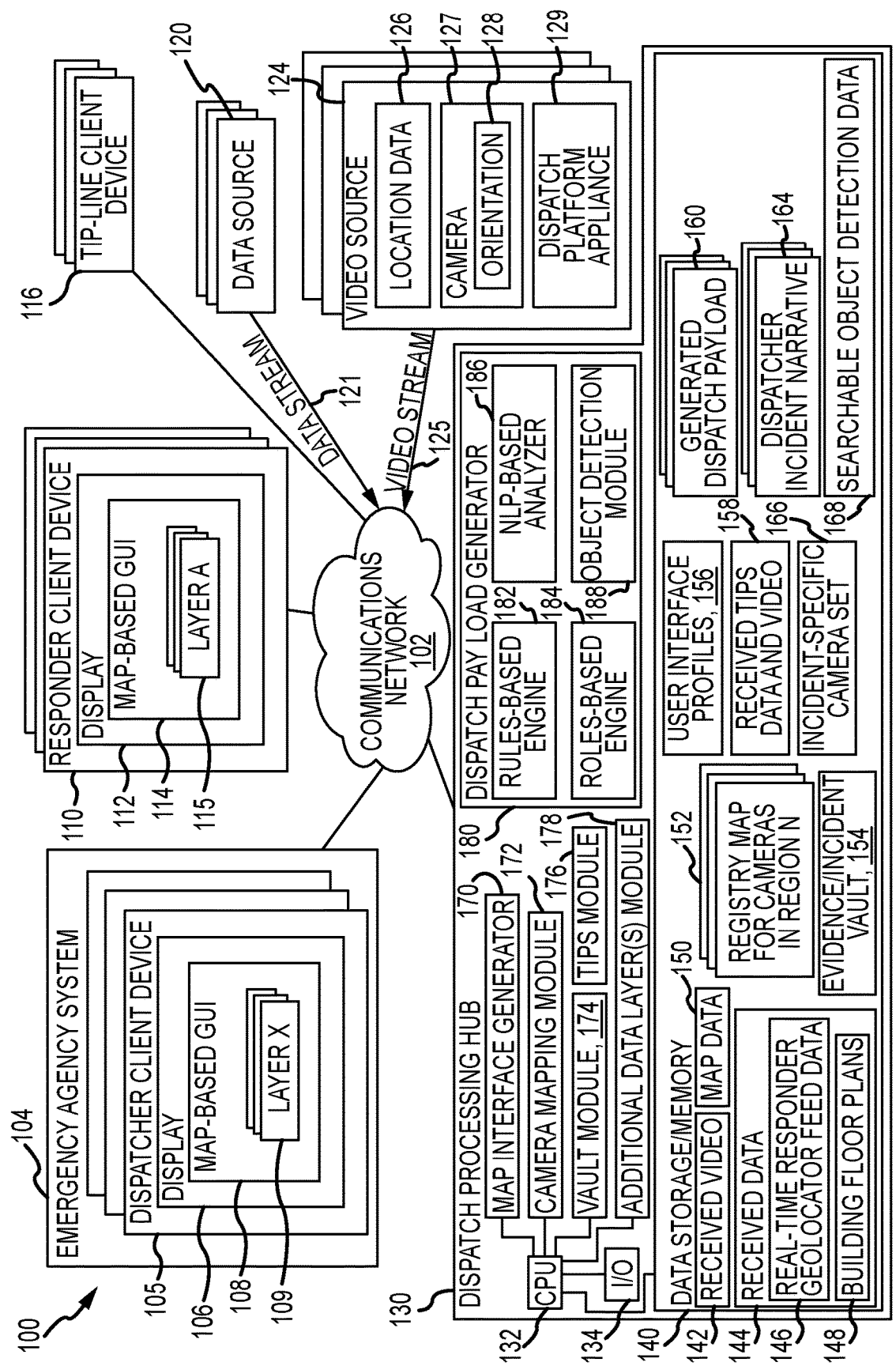
FIG. 1 is a functional block diagram of a cloud-based real-time crime center system configured for providing dispatch directed digital media payloads according to the present description.

FIG. 1 is a functional block diagram of an emergency dispatch system 100 of the present description. The dispatch system 100 is generally made up of a dispatch processing hub 130 that serves combinations of video and data (or a dispatch directed payload) via a map-based interface. In particular, the hub 130 is shown to be linked (e.g., for digital communications), via digital communications network 102, to an emergency agency system 104 (one shown but two, three, or more may be included in system 100), a plurality of responder client devices 110, a plurality of tip-line client devices 116, data sources 120, and video sources 124. The dispatch processing hub 130 is cloud-based (e.g., a Software as a Service (SaaS) platform or the like) that is accessible from any Internet-connected computer device or cell or smartphone.

In this regard, the emergency agency system 104 may include one or more dispatcher client devices 105 that may take the form of nearly any computing device that may communicate directly or indirectly with the hub 130 over the network 102 and may take the form of a desktop or portable computer. The device 105 includes a display (e.g., a touchscreen or monitor screen) 106 that is operable to display or present, to an operator who may be acting as a dispatcher, a map-based graphical user interface (GUI) 108 with one or more data and/or video layers 109 generated and transmitted by the hub 130 during operations of the system 100. Similarly, responders/officers may operate responder client device 110 that may be vehicle-mounted or handheld/portable computing or communication devices such as tablets, computer pads, smartphones, and the like adapted for digital, wireless communications over the network 102 with the hub 130. Each responder client device 110 will include a display device 112 operable to display a map-based GUI 114 with one or more layers 115 of video, data, or combinations thereof generated and transmitted by the hub 130. Further, members of the public may operate tip-line client devices 116 to access the hub 130 to provide tips that may include data and/or video (which is stored at the hub 130 as shown at 158 in memory/data storage 140, which may be located on any cloud-based device at or accessible by the hub 130).

The hub 130 may take the form of one-to-many computing and data storage devices that are cloud-based or accessible via the Internet or other communications network 102. For ease of explanation, though, the hub 130 is shown to include a processor 132 that manages input/output (I/O) devices 134 that may be used to facilitate receipt and transmittal of communications over the network 102 to and/or from the system 104, the responder client devices 110, the tip-line client devices 116, the data sources 120, and the video sources 124. The processor 132 further manages storage and retrieval of information to data storage/memory 140, which may be any data storage device such as a server accessible directly or over the network 102 by the processor 132. The hub 130 performs numerous functions, and, to this end, the processor 132 executes code or instructions (or software, applications, and the like) to provide the functionality (which is described below) of a map interface generator 170, a camera mapping module 172, a vault module 174, a tips module 176, an additional data layer(s) module 178, and a dispatch payload generator 180, which includes or accesses/uses a rules-based engine 182, a roles-based engine 184, a natural language processing (NLP)-based analyzer 186, and an object detection module 188.

Significantly, the dispatch processing hub 130 receives a data stream 121 from one-to-many data sources 120, and the hub 130 (such as via operations of the map interface generator 170) acts to process and store the data 144 in memory 140. The data stream 121 may include real-time responder geolocator feed data 146 providing present locations of responders for the agency running system 104 as well as other information that may be useful to respond to an incident such as building floor plans 148 for buildings in a region(s) served by the emergency agency system 104. The received (or retrieved) data 121 from sources 120 may also include graphical and/or image-based data, as shown at 150 in memory 140, for generating maps and/or map-based interfaces 108, 114 by map interface generator 170.

The video sources 124 may take a variety of forms such as drones, traffic cameras, private cell phone video, building security cameras, responder-utilized robots with cameras, and so on. Each source may provide a video stream 125 that may be stored in memory 140 as received video 142. The records associated with the received video 142 may include location data 126 for the source 124, and the video source 124 may include a video camera 127 having a fixed or changeable orientation 128, which may be provided for each camera as part of or separately from the video stream 125. A dispatch platform appliance 129 may be provided at some or all of the video sources 124 to facilitate the communication of the video stream 125 to the hub 130. In some cases, the appliance 129 is a hardware device that is small, lightweight, and configured to be a plug-and-play device that connects to the camera 127 (or to a network to which the source 124 is linked and/or accessible) so as to bring the video sources 124 into the system 100 (or into the cloud to which the hub 130 is associated with).

Figure 3:
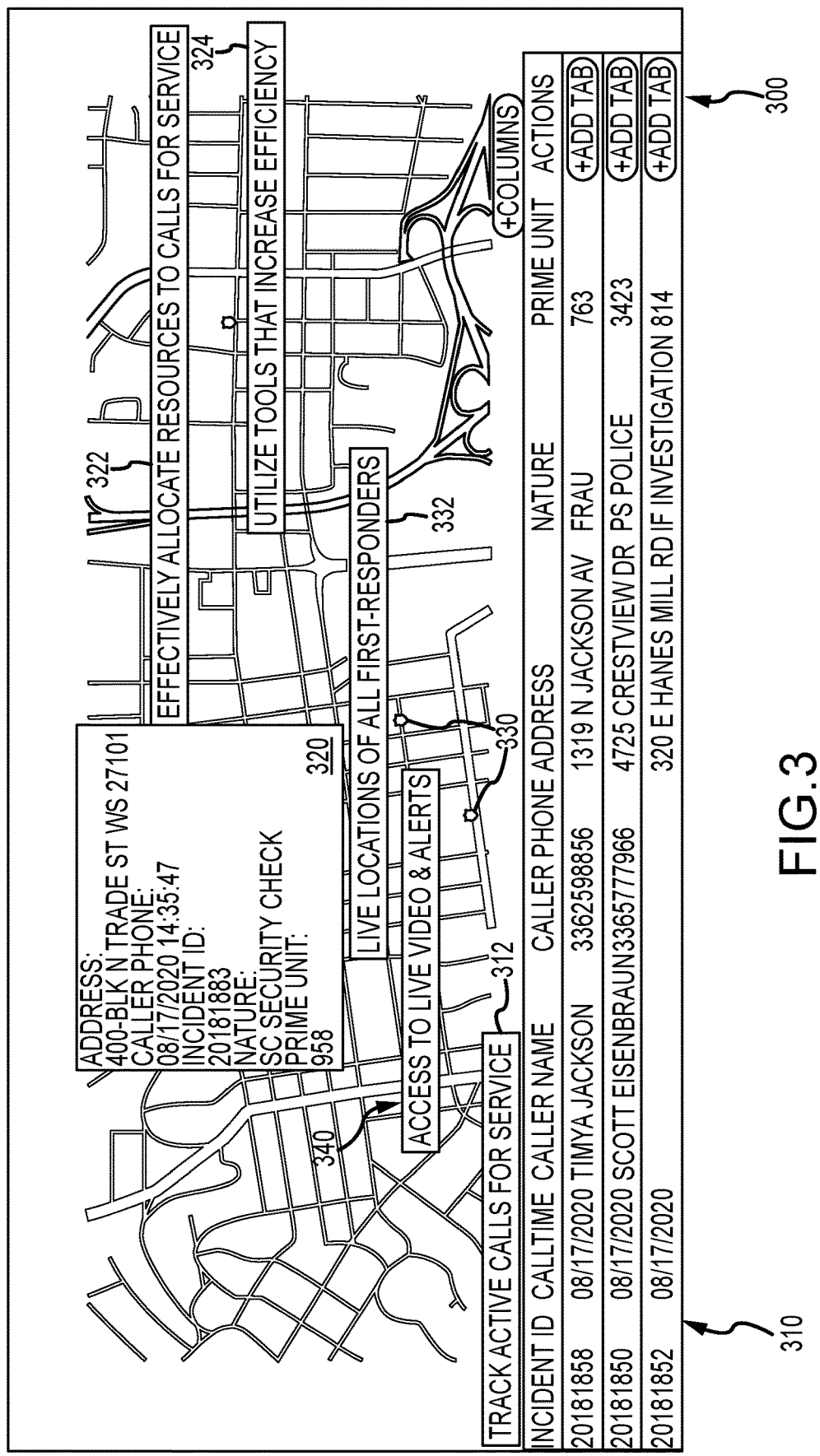
FIG. 3 illustrates an exemplary map-based user interface generated and presented to a dispatcher during operations of the system of FIG. 1.
Figure 4:
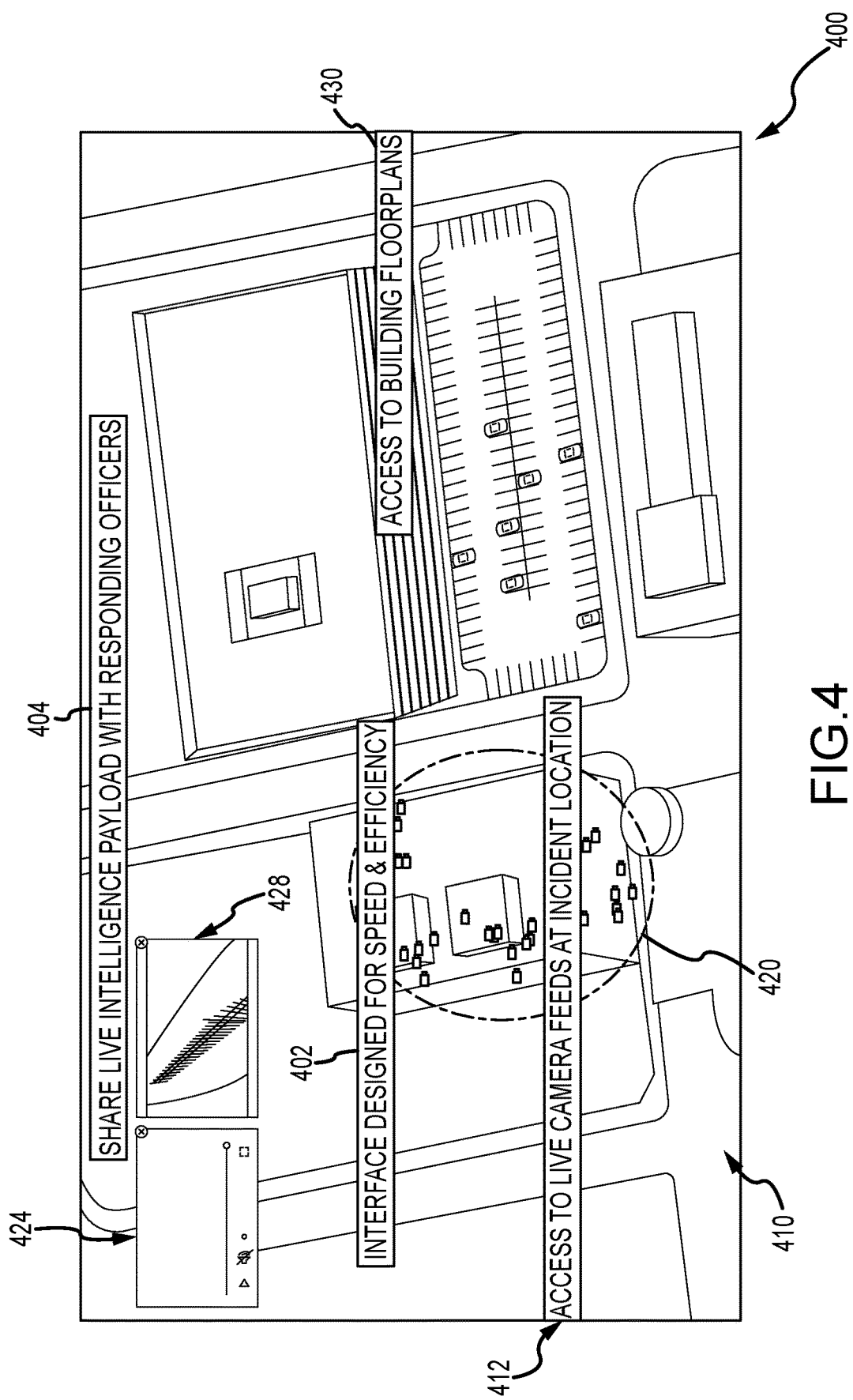
FIG. 4 illustrates an exemplary map (or image)-based user interface generated and presented to a responder during operations of the system of FIG. 1.

At this point in the description, it may be useful to provide further detail of some of the major components of system 100 including their functions to provide the map-based GUIs 108 and 114 to dispatcher/agency personnel (operators of devices 105) and to responder/field personnel (operators of devices 110), respectively. The map interface generator 170 provides these primary map interfaces 108, 114 to the processing hub 130, and the interfaces 108, 114 are primarily designed to be real-time situational awareness interfaces that display real-time information in a variety of configurations (as seen in FIGS. 3 and 4). The interface generator 170 pulls in real-time data, such as video 142 and received data 144 from a variety of sources 120, 124 and displays it in a map-based format based on map data 150. Primary users of the interfaces 108, 114 provided by interface generator 170 may be real-time crime center personnel and 9-1-1 operators using the devices 105 and officers, emergency responders, SWAT leaders, event and incidence response coordinators, and the like using the devices 110, who will use the interfaces 108 and 114 to direct unfolding situations.

Views of these interfaces 108, 114 are configurable by the generator 170 based on default or user-modified interface profiles 156, which can be used by users to cause the generator 170 to bring in various video elements 142 and data elements 144 as needed to support their roles in incident response (and which may be provided in user-selectable or default data/video set layers 109, 115, which may be generated by an additional data layer module 178). For example, a 9-1-1 operator will likely use a high-level view via their GUI 108 involving potential incident identification based on the triangulation of weapon discharges detected using previously deployed microphone arrays (e.g., ShotSpotter (or other gunshot detection software/system that detects and conveys the latitude and longitude of gunfire or other weapon fire using acoustic sensors) may be used to trigger the system 100 by a gunfire detection alert to turn on and record live (or pre-buffered) video from all connected cameras within a predefined radius of the detected shot), real-time video of situations, and/or office/responder geolocations 146. In contrast, a SWAT leader may use their GUI 114 on their client device 110 to provide zoomed-in map data 150 and detail-oriented configurations set by their profiles 156 and/or by field interactions such that the interface 114 may include floor plans 148 of buildings in the map-based GUI 114 (e.g., in geographic region for incident), real-time video 142, and teams (e.g., of available responders as may be defined by one of the data sources 120 and with locations provided via geolocator data 146 from the same or other data source 120). The user interface profile 156 may be added to by the users building upon, in many cases, a default or preconfigured profile (e.g., one for GUI 108 and one for GUI 114 to suit the planned users of the system 100).

The vault module 174 is included in the system 100 to support effective evidence collection and review by investigators both during the investigation of the incident and after the incident has been resolved. The module 174 generates and stores data collected for and transmitted to system users via interfaces 108 and 114 in an evidence vault 154, which is incident specific and which may be CJIS compliant for digital evidence. The vault 154 provides a data management system that collects all pictures, videos, and data related to an incident, and this collected incident information/evidence may be added to a particular incident (which is assigned a unique identifier) folder. The stored information/evidence may be tagged with the incident number/identifier and may include all metadata associated with each piece of information/evidence. The vault information/evidence may include portions of received tips data and video 158 received by the hub 130 from tip-line client devices 116 that are relevant to the incident and video collected 142 from video sources 124 related to the incident (e.g., via dispatch platform appliances 129, shown or accessed by operators in interfaces 108, 114, and manually from any video/still cameras in registry map 152.

The camera mapping module 172 is a cloud-based public camera mapping software that produces a registry map 152 for cameras in various geographic regions. The module 172 provides a mass-configurable public portal to register security cameras 127 as video sources 124 for the hub 130. The registry map 152 and video received 142 from such cameras 172 can be fed by the map interface generator 170 into the map-based GUIs 108, 114. Users of the map-based GUIs 108, 114 can, during operation of the system 100, request (such as via selection of a camera icon associated with each camera 127 provided at their physical location (e.g., determined from location data 126) in the interface 108, 114) video footage 142 directly from the camera mapping interface 108, 114 and the received (which may only occur in some cases upon request from a user) video 142 may then be filed by the vault module 174 in the vault 154 for evaluation.

The map interface generator 170 may include one or more subroutines or callable applications to create a common operating picture for first responders (i.e., operators of the responder client devices 110 via map-based GUI 114). For example, these subroutines/applications may operate to provide additional data views to video 142 and data 144 and to provide controls that can be stored within a tab in the GUI 114 (or otherwise be initiated or accessed by an operator of the device 110). Users who have access to this tab or initiation interface (e.g., all or a subgroup of the responders such as differing access for leaders than for other members of a team) are able to view additional real-time data sets in the map-based GUI 114 (such as in a differing data layer 115, which may be generated by the additional data layer module 178). The users may also be allowed to configure (and pre-configure via profiles 156) specific map views provided by the map interface generator 170 to better meet their needs. The layers 115 of the interface 114 may provide users of devices 110 with data including teams, call signs, and direct messaging to other personnel accessing the hub 130. To this end, a companion application (not shown in FIG. 1) may be provided on the responder client device 110 (e.g., a smartphone or the like) that allows for geolocation of officers in the field to be provided in the interface 114 (e.g., via mapping of geolocator data 146 received at/retrieved by the hub 130). The companion app may also support individual and group messaging and data sharing across the client devices 110 (and/or with client devices 105), and the users of the companion app would be provided access to the map-based GUI 114 and associated data and video via their client device 110.

The tips module 176 provides a public safety utility or functionality that operates, such as via text message with or a client-based app or on the tip-line client devices 116, which communicate over network 102 with the hub 130 and the module 176. Members of the public can operate their client devices 116 to anonymously submit tips, which are stored as shown at 158 in memory 140 by the tips module 176, to the agency associate with the emergency agency system 104 (e.g., a police department) by either texting messages/text, pictures, and/or videos to a publicized number or via a client-based (e.g., smartphone) app running on their client device 116. The client-based app may be configured to give the user of the device 116 access to incident (e.g., crime)-related data published by the particular agency. In some embodiments of the system 100, the received tips information 158 may be triaged by one or more of their personnel in response to receiving a new tip alert from the tips module 176 (such as via an update to the map-based GUI 108 on an agency client device 105 created by operations of the map interface generator 170 processing messages from tips module 176). The tips 158, which may be filtered or not by the triage personnel to identify useful or reliable tip information 158, may then be stored as evidence in the incident folder in the vault 154.

The dispatch platform appliances 129 are connected video sources 124 (such as individual cameras or networks of such cameras) to create a separate secure live video feed 142 to the hub 130. The live video feeds are accessed by operators of the client devices 105, 110 via the GUIs 108, 114 in either a map or grid view (which may be selected by an operator of the client devices 105, 110 or be set for their particular role in the dispatch system 100 such as for a dispatcher or field-based responder). The appliances 129 may be equipped with AI at the edge-type code/software. With AI at the edge-type technology, an inexpensive appliance 129 can be plugged into a camera 127 to instantly turn it into a smart, cloud-connected device capable of analyzing data as close as possible to the source.

For example, in some embodiments of system 100, video data is analyzed and processed at the camera 127 or at the source 124, and, based on this processing, a subset of the video or video-based/related data determined to be salient to an incident is moved (as shown with video stream 125) into the cloud for receipt as video 142 for use at the hub 130. This means that cameras 127 that are commercial and consumer grade (or better) from businesses or the like can readily have AI applied to them quickly and affordably, which will vastly increase the number of available intelligence nodes (or video sources 124) for a real-time crime center or other entity employing the emergency agency system 104 and responder client devices 110. This approach or design for system 100 also significantly reduces costs for data servers, additional bandwidth, and infrastructure usually associated with high-volume video collection and analysis.

To support the map interface generator 170, the hub 130 runs a dispatch payload generator 180 (e.g., to provide data and video for populating and for identifying data and video accessible via the interface 108, 114). The payload generator 180 provides a significant enhancement to law enforcement (and other emergency response) information delivery systems and can be thought of as introducing several firsts to the public safety intelligence ecosystem. In this regard, the payload generator 180 is configured to add video intelligence to traditional 9-1-1 call centers by utilizing a rules-based engine 182. During operations of the system, an incident (or 9-1-1) call is made for service (e.g., to agency system 104 which is linked via network 102 to hub 130). The rules-based engine 182 then responds by interpolating or determining based on call-related data and/or previously received data in memory 140: (1) the priority of the call; (2) the assignee or first responder for the call (e.g., based on type of call and/or location of available responders); (3) the location of this first responder relative to the location of the call for service (or location of an incident being reported in call); (4) the responder's mode of receipt of data (e.g., the type of client device 110 they use and/or the specification of the display 112 and/or the user interface profile 156 associated with the responder); and (5) based on the responder's role within the agency receiving the call, the type of information useful for the responder in addressing the incident identified by or associated with the call for service. The rules-based engine 182 is adapted to achieve automated interoperability between multiple systems that may already be in use by the agency implementing the system 104 and client devices 110, which until the present invention were disparate and manually controlled by separate users (e.g., dispatch software, surveillance management software, communications hardware, and iOS and Android mobile devices and PC computing devices). This processing is used, in part, to generate the dispatch payload 160.

To further tailor the payload 160 delivered to the client devices 105, 110 (e.g., in or via interfaces 108, 114), the payload generator 180 includes a roles-based engine 184. The roles-based engine 184 is configured to allow responders (operators of devices 110) to receive information related to calls for service or alerts (such as license plate recognition alerts) that are germane to their role within the agency using the system 100. Such roles may be stored in the user interface profiles 156 or otherwise in data storage accessible by the engine 184. The system 100 may further expedite generation of the payload 160 by the generator 180 through AI in video analysis to identify video (e.g., a subset or portion of all) within the received video 142 or that available via video streams 125 from sources 124 (e.g., surveillance and mobile cameras) and IoT information (e.g., information from gunshot, license plate, and other alert and data gathering systems) related to the call for service in addition to jurisdictional and patrol-zone boundaries applicable to responding resources. This identified additional information may be provided in layers 109, 115 by the additional data layer module 178 and interface generator 170 and/or in payload 160 to client devices 105, 110 to aid the responder with video and IoT intelligence to achieve more agile and proportionate responses to the incident/call for service by the responders.

The combination of the map interface generator 170 and the payload generator 180 provide a number of unique features that make the operation of the system 100 different than prior dispatch solutions. The hub 130 with its dispatch payload generator 180 and map interface generator 170 is the first solution to tie together all data and video sources 120, 124 that may be useful and desired by law enforcement, security, or other emergency response agency and deliver them via a cloud-based platform in real-time to both facilities that manage emergency response (e.g., via interface 108 on client devices 105 in emergency agency system 104) and those in the field who are executing the response (e.g., responders operating the client devices 110 to access and interact with the interface 114).

Further, the hub 130 is configured to enable law enforcement and other responder agencies to easily integrate and aggregate previously hard-to-access sources of video and data among sources 120, 124. These data and video sources 10, 124 may include helicopter, drone, robot, and fixed camera sources (e.g., cameras 127 of video sources 124 providing video streams 125). The integration of these sources 120, 124 into a single unified dispatch payload 160 accessible within a single interface 108 or 114 is unique to the design of system 100. The solution provided during operations of the system 100 is cloud-based and uses existing video and security infrastructure while also, in some embodiments, bringing non-EDGE-based legacy device data into the cloud for analysis (e.g., to be part of data and video streams 121, 125 accessible by the hub 130). Additionally, the methods of rendering the dispatch payload 160 within a map-based interface 108, 114 by the map interface generator 170 (and/or other components of the hub 130) is unique to the design and implementation of the system 100. This uniqueness includes the manner in which the data and video is unified within a maps interface 108, 114 for usability and efficiency.

Figure 2:
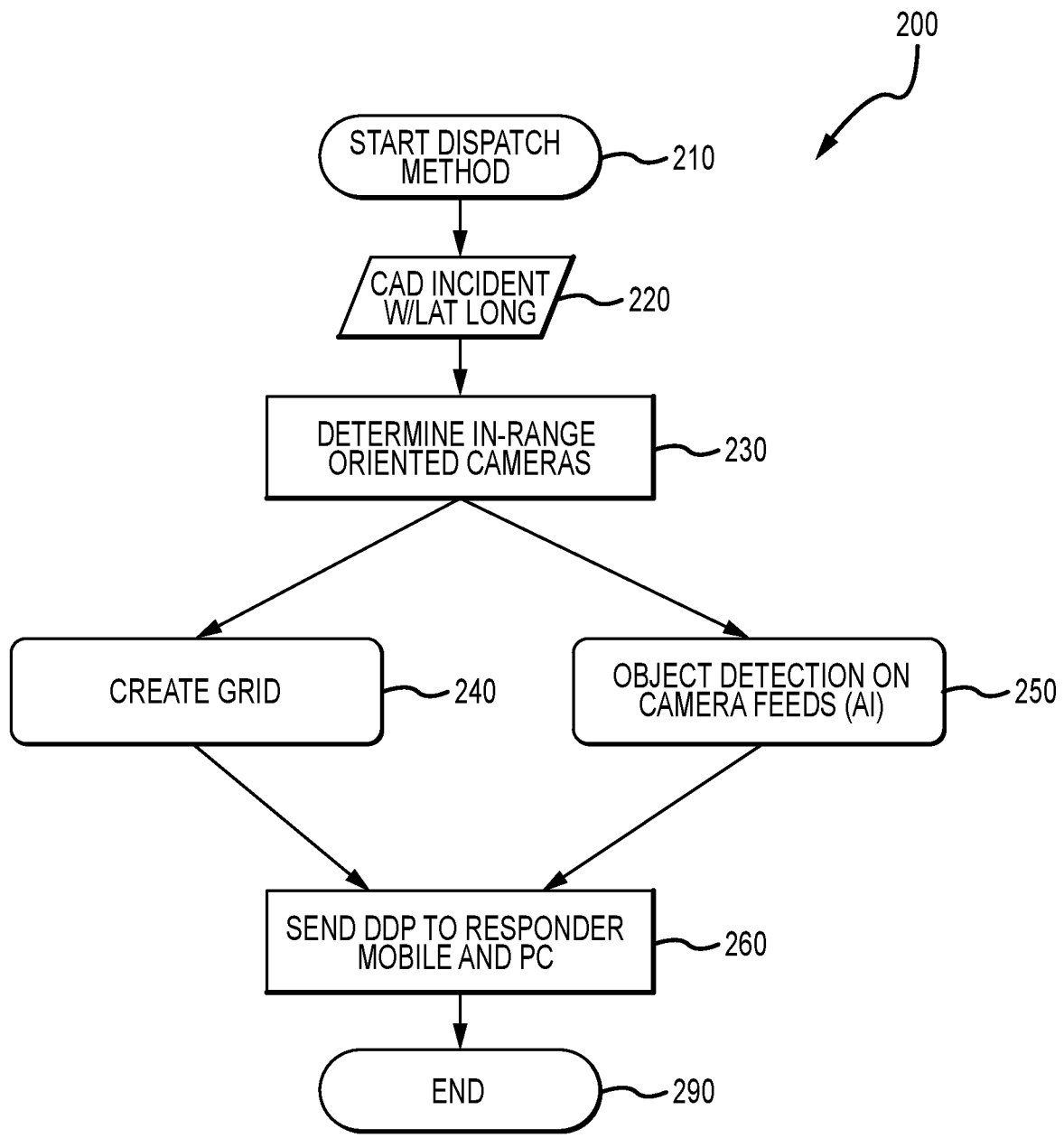
FIG. 2 is an exemplary method of generating and distributing a dispatch payload such as may be implemented during operation of the system of FIG. 1.

FIG. 2 is an exemplary method 200 of generating and distributing a dispatch payload 160 such as may be implemented during operation of the system 100 of FIG. 1 by the payload generator 180 (alone or in combination with other modules/subroutines). The method 200 starts at 210 such as with implementing the system 100 by providing the dispatch processing hub 130 on the network 102 and communicatively linking (e.g., via subscription to services provided by the hub 130) the emergency agency system 104 to the hub 130 along with client devices 110 made available to responders associated with the agency running the system 104. Step 210 may also involve achieving a data link with data sources 120 and video sources 124 so as to make them cloud-based (e.g., by providing the dispatch platform appliance on cameras 127 and/or networks of cameras 127).

The method 200 continues at 220 with a call for service being received at the agency system 104 and such call being identified to the hub 130. The dispatch payload generator 180 includes an NLP-based analyzer 186 that acts to perform NLP (and/or other analysis) of the dispatcher call and/or the dispatcher incident narrative of the call, which is stored at 164 in the memory 140. The analysis (and, in some cases, the raw call and narrative) 164 may also be stored in the appropriate folders of the evidence vault 154. The analysis of the call and/or the dispatcher incident narrative in step 220 is used to determine a location (e.g., latitude and longitude) of the incident to which the call is related.

The method 200 continues at 230 with the dispatch payload generator 180 generating an incident-specific camera set 166 from the available cameras 127 (or video sources 124). The cameras 127 determined to be in the set 166 may be public and/or private cameras and may be in the registry map 152 for a geographical region associated with the location of the incident. In some cases, the region or area used to locate useful cameras 127 for the set 166 is defined by the visible range circumference about the incident location (e.g., a predefined maximum range for the highest expected quality camera 127 providing the video streams 125). The set 166 in some cases only includes those cameras 127 with an orientation 128 that would allow that camera 127 to capture some or all of the scene associated with the incident. In some cases, such object detection in the feeds 125 is used in step 230 for determining the cameras 127 to include in the set 166, e.g., is a detectable object, such as a particular individual or vehicle, associated with the incident found in the feed 125, and, if so, include that camera 127 in the set 166).

The automated usage of camera orientation 128 allows the payload generator 180 to detect the cameras 127 within the visible range circumference of, and oriented on, the location of the incident. To capture all possibly useful cameras 127 in the set 166, "oriented on" may be defined as some angular offset from the line of focus of the camera 127 (e.g., the line of focus may be plus or minus 30 degrees (or less) from being orthogonal to the location (latitude and longitude, for example) of the incident). The location of the cameras 127 in the set 166 are indicated via camera icons on the map-based interfaces 108 and/or 114, and the payload 160 may include or allow access to the video streams 125 in the received video 142.

The method 200 continues at 240 with creating a grid of the region about incident location for use by the map interface generator 170 in generating the underlying map imagery for the map-based interfaces 108, 114. At 250, the method 200 includes use of an object detection module 188 of the payload generator 180 in the video streams 125 from the cameras 127 in the set 166. Once applicable cameras 127 for inclusion in the incident-specific set 166 are determined, step 250 involves the module 188 performing object detection using AI-based object detection or the like. This may include performing object detection on the edge-recorded video content 142 from those cameras 127 in the set 166. Further, it may be useful for the module 188 (or generator 180) to be adapted to make the metadata associated with the identified objects and/or video feeds available and searchable as shown at 168 in memory 140 of the hub 130.

Additionally, applicable personnel (e.g., operators of the client devices 105 or 110) may instantiate a bulk request to cameras 127 that are not in the registry map 152 to acquire digital content 125 applicable to the incident. Further, technologies supporting dispatch personnel may be provided in the system 100 to assist in the curation of applicable camera 127 for providing the video feeds 125 and for inclusion in the set 166 used to create the payload 160 for the incident. Viewable grids may be created in step 240 for distribution in the payloads 160 and for viewing in the interface 114 on responder client device 110 by field personnel to address additional tactical challenges of both direct support and surveillance operations.

The method 200 continues at 260 with the dispatch directed payload 160 being sent by the map interface generator 170 to the client devices 110 (mobile computing or communication devices or vehicle-mounted devices (or even desk stations)) over network 102 for viewing or accessing via the map-based GUI 114. The data and/or video of the payload 160 may be viewed in a single layer or multiple layers 115 provided over the map or grid of the geographical area about the incident location. The method 200 then ends at 290.

FIG. 3 illustrates an exemplary map-based user interface 300 as may be generated and presented to a dispatcher via the display 106 of their client device 105 during operations of the system 100 of FIG. 1. Similarly, FIG. 4 illustrates an exemplary map (or image)-based user interface 400 generated and presented to a responder via the display 112 of their client device 110 during operations of the system 100 of FIG. 1. Annotation boxes (such as box 312 in FIG. 3) are provided in these figures for ease of explanation but, in practice, would not be included in the interfaces 300 and 400.

As shown in FIG. 3, the GUI 300 provides a high-level map (e.g., a graphical representation of the geographic area showing streets and street names) of an area monitored and serviced by a particular response agency or by a particular dispatcher of that agency. A subwindow or chart 310 may be provided that, as indicated by annotation box 312, provides a listing of and details of calls for service including an incident ID, a call time, an address/location, and an identifier for a first responder. An active incident box 320 may be displayed over the map details to show the dispatcher details of an incident they are working on to facilitate as indicated with annotation boxes 322 and 324 the effective allocation of resources to calls for service and to assist in use of tools that increase efficiency, which are available via the interface 300 to the dispatcher. The information displayed to the dispatcher may include visual icons 330 representing as shown in annotation box 332 live locations of all first responders available (or status may be shown) to address the incident. The tools further include as shown with button or annotation box 340 access to live video and alerts, e.g., the dispatcher may be able to drill down via the interface 300 to access video streams from cameras in the region especially those associated with a particular incident.

As shown in FIG. 4, the GUI 400 provides a low-level map (e.g., an image-based map of the geographic area showing streets and street names) 410 of an area surrounding or involved in a particular incident to which a responder operating a client device displaying the GUI 400 is responding to (e.g., with the center of the image coinciding with the location assigned to the incident). As indcted in annotation box 402 the interface 400 is configured or designed for speed and efficiency in its use by a first responder or responder team leader. Annotation box 404 clarifies that the GUI 400 is useful for sharing a live intelligence payload (e.g., payload 160 of FIG. 1) with responding officers (operators of the client devices 110 of FIG. 1).

Particularly, the GUI 400 includes a plurality of camera icons 420, and a user of the GUI 400 can select any of these icons 420 (e.g., representing an incident-specific camera set 166 of FIG. 1) to obtain a live video stream being captured by a camera at or near the location of the icon on the map 410. This can be seen with window 424 and 428 showing video streams (part of payload 160 of FIG. 1) within the map-based GUI 400, such as a layer overlying the map 410 in an area of the GUI 400 that is spaced apart from the location of the incident to retain a clear view of the map information near the incident. Annotation box 422 indicates that the interface 400 provides a user with access to live camera feeds at the incident location (as cameras associated with icons 420 all are orientated to capture portions of the incident scene and are within range of the location of the incident).

Other data from data sources may also be accessed via the interface 400 (e.g., data 144 in FIG. 1 may be provided as part of the payload 160 or be accessible via the interface 114 in FIG. 1), and annotation box 430 provides the useful example that building floor plans may be accessed via the interface 400 (such as for display in a layer of the GUI 400 or as separate windows (displayed in split or whole screen on a display of a client device), e.g., via clicking on an icon or via a menu of action buttons (see upper left portion of GUI 400 for some exemplary actions that may be taken from the GUI 400).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, the system 100 may include a list of registered cameras that are not connected to our system as live cameras but for which locations, orientations, and owners are known. From those owners, the system or its operators may request the submission of video evidence with time signatures that encompass the reported incident for addition in the DDP after the fact. This request can be made in bulk to all in-range owners utilizing the same logic that was applied to determine live cameras that are applicable to the incident due to their orientation and proximity.

We claim:

1. An emergency dispatch system, comprising:
   a dispatch processing hub communicatively linked via a communications network with a plurality of client devices;
   data storage storing data from data sources and video from video sources;
   on the dispatch processing hub, a map interface generator generating a map-based interface for display upon a display device of each of the plurality of client devices, wherein the map-based interface provides access to a subset of the video from the video sources and to a subset of the data from the data sources; and
   on the dispatch processing hub, a dispatch payload generator generating a payload accessible by or for delivery to the plurality of the client devices including the subset of the video and the subset of the data both being determined by the dispatch payload generator as being related to an incident call received by an emergency agency system,
   wherein the subset of the data and the subset of the video are selected based on at least one of a responder assigned to the incident call, a priority of the incident call, a mode of data receipt associated with the responder assigned to the incident call, and a role within an emergency agency of the responder assigned to the incident call,
   wherein the data storage stores a registry map defining cameras available in the video sources to provide the video and further stores associated locations within a geographic region of each of the cameras,
   wherein the dispatch payload generator determines a set of the cameras being within image-capture range of a location of an incident associated with the incident call, and
   wherein video streams from each of the set of cameras are provided in the subset of the video in the payload.

2. The system of claim 1, wherein the dispatch payload generator performs at least one of analysis of the video with artificial intelligence to identify the subset of the video as being related to the incident call and analysis of Internet-of-Things (IoT) information gathered by the dispatch processing hub to identify a set of IoT information related to the incident call to be included in the payload, and wherein the set of IoT information related to the incident call includes data from at least one of a gunshot or license plate alert and gathering system, teams or call signs for use in responding to the incident call, and direct messaging to other personnel accessing the dispatch processing hub.

3. The system of claim 1, wherein the dispatch payload generator uses a rules-based engine to generate the payload.

4. The system of claim 3, wherein the rules-based engine is configured to determine the priority of the incident call and controls delivery of the payload based on the priority of the incident call.

5. The system of claim 1, wherein the dispatch payload generator processes the subset of the video to detect objects and wherein, in response, generates a set of searchable object detection data.

6. The system of claim 1, wherein the subset of the data includes at least one building floor plan for a building at or proximate to a location of an incident associated with the incident call and wherein the map-based interface includes a link to the at least one building floor plan.

7. The system of claim 1, wherein the dispatch payload generator processes a dispatcher narrative of the incident call using natural language processing (NLP) to determine a location of an incident associated with the incident call.

8. The system of claim 1, wherein the payload is stored in the data storage in an evidence vault to be accessible by an identifier for an incident associated with the incident call.

9. The system of claim 1, wherein a plurality of the video sources include cameras or networks of cameras and wherein the system further includes a dispatch platform appliance coupled with the cameras or networks of cameras to communicatively link the cameras or networks of cameras with the dispatch processing hub, whereby video streams from the cameras or networks of cameras are automatically fed over the communications network to the data processing hub.

10. An emergency dispatch system, comprising:
    a dispatch processing hub communicatively linked via a communications network with a plurality of client devices;
    data storage storing data from data sources and video from video sources;
    on the dispatch processing hub, a map interface generator generating a map-based interface for display upon a display device of each of the plurality of client devices, wherein the map-based interface provides access to a subset of the video from the video sources and to a subset of the data from the data sources; and
    on the dispatch processing hub, a dispatch payload generator generating a payload accessible by or for delivery to the plurality of the client devices including the subset of the video and the subset of the data both being determined by the dispatch payload generator as being related to an incident call received by an emergency agency system,
    wherein the subset of the data includes geolocations of responders in a geographic region including a location of the incident,
    wherein the map-based interface includes indicators of one or more of the geolocations of the responders,
    wherein the data storage stores a registry map defining cameras available in the video sources to provide the video and further stores associated locations within a geographic region of each of the cameras,
    wherein the dispatch payload generator determines a set of the cameras being within image-capture range of a location of an incident associated with the incident call, and
    wherein video streams from each of the set of cameras are provided in the subset of the video in the payload.

11. The system of claim 10, wherein the dispatch payload generator processes the subset of the video to detect objects and wherein, in response, generates a set of searchable object detection data.

12. The system of claim 10, wherein the subset of the data includes at least one building floor plan for a building at or proximate to a location of an incident associated with the incident call and wherein the map-based interface includes a link to the at least one building floor plan.

13. The system of claim 10, wherein the dispatch payload generator processes a dispatcher narrative of the incident call using natural language processing (NLP) to determine a location of an incident associated with the incident call.

14. The system of claim 10, wherein a plurality of the video sources include cameras or networks of cameras and wherein the system further includes a dispatch platform appliance coupled with the cameras or networks of cameras to communicatively link the cameras or networks of cameras with the dispatch processing hub, whereby video streams from the cameras or networks of cameras are automatically fed over the communications network to the data processing hub.

15. The system of claim 10, wherein the dispatch payload generator uses a rules-based engine to generate the payload and wherein the subset of the data and the subset of the video are selected based on at least one of a responder assigned to the incident call, a mode of data receipt associated with the responder assigned to the incident call, and a role within an emergency agency of the responder assigned to the incident call.

16. The system of claim 10, wherein the dispatch payload generator performs at least one of analysis of the video with artificial intelligence to identify the subset of the video as being related to the incident call and analysis of Internet-of-Things (IoT) information gathered by the dispatch processing hub to identify a set of IoT information related to the incident call.

17. An emergency dispatch system, comprising:
 a dispatch processing hub communicatively linked via a communications network with a plurality of responder client devices and with a dispatcher client device;
 data storage storing data from data sources and video from video sources;
 on the dispatch processing hub, a map interface generator generating a map-based interface provided on the responder client devices and the dispatcher client device, wherein the map-based interface provides access to a first subset of the video from the video sources and to a first subset of the data from the data sources on the responder client devices based a plurality of responder user profiles and wherein the map-based interface provides access to a second subset of the video from the video sources and to a second subset of the data from the data sources on the dispatcher client device based a dispatcher user profile; and
 on the dispatch processing hub, a dispatch payload generator generating a first payload accessible by or for delivery to the plurality of the responder client devices including the first subset of the video and the first subset of the data, the dispatch payload generator further generating a second payload accessible by or for delivery to the at least one dispatcher client device including the second subset of the video and the second subset of the data,
 wherein the first and second payloads are determined by the dispatch payload generator as being related to an incident call received by an emergency agency system,
 wherein the dispatch payload generator processes a dispatcher narrative of the incident call using natural language processing (NLP) to determine a location of an incident associated with the incident call, and
 wherein the first and second payloads are determined at least in part based on the location of the incident determined using NLP.

18. The system of claim 17, wherein the first and second subsets of the data include geolocations of responders in a geographic region including a location of the incident, wherein the map-based interface includes indicators of one or more of the geolocations, wherein the first subset of the data includes at least one building floor plan for a building at or proximate to a location of an incident associated with the incident call, and wherein the map-based interface includes a link to the at least one building floor plan.

* * * * *